(12) United States Patent
Zelik et al.

(10) Patent No.: US 12,686,112 B2
(45) Date of Patent: Jul. 21, 2026

(54) CLUTCH MECHANISMS AND USES OF THE SAME

(71) Applicant: Vanderbilt University, Nashville, TN (US)

(72) Inventors: Karl E. Zelik, Nashville, TN (US); Michael Goldfarb, Nashville, TN (US); Paul R. Slaughter, Nashville, TN (US); Shane T. King, Nashville, TN (US); Cameron A. Nurse, Nashville, TN (US); Chad C. Ice, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 825 days.

(21) Appl. No.: 18/157,317

(22) Filed: Jan. 20, 2023

(65) Prior Publication Data

US 2023/0234215 A1    Jul. 27, 2023

Related U.S. Application Data

(60) Provisional application No. 63/303,204, filed on Jan. 26, 2022.

(51) Int. Cl.
| | |
|---|---|
| B25J 9/00 | (2006.01) |
| B25J 9/10 | (2006.01) |
| B25J 13/08 | (2006.01) |

(52) U.S. Cl.
CPC ............. B25J 9/0006 (2013.01); B25J 9/104 (2013.01); B25J 13/088 (2013.01)

(58) Field of Classification Search
CPC ........ B25J 9/0006; B25J 9/104; B25J 13/088; F16D 7/022; F16D 2300/18; F16D 59/02;

B66D 5/30; A61H 3/00; A61H 2003/007; A61H 2201/1472; A61H 2201/16; A61H 2201/1623; A61H 2201/165; A61H 2205/10; A61H 1/00; A61H 1/02
USPC ........................................................... 43/20
See application file for complete search history.

(56) References Cited

U.S. PATENT DOCUMENTS

| | | | |
|---|---|---|---|
| 10,195,736 B2 * | 2/2019 | Barnes ................. | B25J 19/0016 |
| 11,148,279 B1 * | 10/2021 | Mooney ............... | A61H 1/0266 |
| 12,025,188 B1 * | 7/2024 | Abate ..................... | B23P 21/00 |

(Continued)

FOREIGN PATENT DOCUMENTS

| | | | | |
|---|---|---|---|---|
| CN | 114634068 A | * | 6/2022 | ............ B25J 9/0006 |
| KR | 20230085662 A | * | 6/2023 | .............. B25J 9/104 |

(Continued)

OTHER PUBLICATIONS

Machine translation of description and claims for CN114634068A via google patents (Year: 2020).*

(Continued)

*Primary Examiner* — Bradley H Philips
*Assistant Examiner* — Tyler A Raubenstraw
(74) *Attorney, Agent, or Firm* — NIXON PEABODY LLP

(57) ABSTRACT

A clutch mechanism includes a spool that is configured to receive a cable, a disk with elasticity, a mechanism configured for locking and unlocking the movement of the disk, and at least one sensor. The at least one sensor being configured to measure the movement of at least one of the disk and the spool in the unlocked mode and to measure the movement of the spool relative to the disk when in a locked mode.

20 Claims, 13 Drawing Sheets

(56) References Cited

U.S. PATENT DOCUMENTS

| | | | | | |
|---|---|---|---|---|---|
| 2006/0075989 A1* | 4/2006 | Barth | ...................... | F02B 53/04 | |
| | | | | | 123/209 |
| 2011/0056789 A1* | 3/2011 | Holbein | .................. | B60R 22/46 | |
| | | | | | 192/45.1 |
| 2015/0300418 A1* | 10/2015 | Averill | ................. | B60K 17/344 | |
| | | | | | 192/20 |
| 2015/0362021 A1* | 12/2015 | Heitzenrater | .......... | F16D 13/58 | |
| | | | | | 192/112 |
| 2015/0380144 A1* | 12/2015 | Heravi | ................... | H01F 7/081 | |
| | | | | | 335/229 |
| 2016/0106615 A1* | 4/2016 | Lee | ......................... | A61H 3/00 | |
| | | | | | 414/4 |
| 2017/0119613 A1* | 5/2017 | Roh | ..................... | A61H 1/0237 | |
| 2017/0367852 A1* | 12/2017 | Kazerooni | ............... | A61H 3/00 | |
| 2018/0066719 A1* | 3/2018 | Klaser | .................... | F16D 48/06 | |
| 2018/0133905 A1* | 5/2018 | Smith | .................... | F16D 25/14 | |
| 2018/0141781 A1* | 5/2018 | Davis, III | ................ | B66B 5/22 | |
| 2018/0200896 A1* | 7/2018 | Boyland | ............... | H02K 7/102 | |
| 2021/0164526 A1* | 6/2021 | Kimes | .................... | F16D 41/16 | |

FOREIGN PATENT DOCUMENTS

| | | | | | |
|---|---|---|---|---|---|
| WO | WO-2019064020 A1 * | 4/2019 | ............ | B25J 9/0075 |
| WO | WO-2020172403 A1 * | 8/2020 | ............ | B25J 9/1025 |
| WO | WO-2021094737 A1 * | 5/2021 | ......... | A62B 35/0093 |

OTHER PUBLICATIONS

Machine translation of description and claims for KR20230085662A via google patents (Year: 2021).*

* cited by examiner

CLUTCH MECHANISMS AND USES OF THE SAME

CROSS-REFERENCE TO RELATED APPLICATIONS

This application claims priority to and the benefit of U.S. Provisional Application No. 63/303,204 filed Jan. 26, 2022 and entitled "Instrumented Clutch Devices, Systems And Methods Of Use," the contents of which are herein incorporated by reference in their entirety.

GOVERNMENT LICENSE RIGHTS

This invention was made with government support under Grant No. R01EB028105 awarded by the National Institutes of Health. The government has certain rights in the invention.

FIELD OF THE INVENTION

This application is directed to clutch mechanisms and, more specifically, is directed to clutch mechanisms with integrated force and motion sensing.

BACKGROUND OF THE INVENTION

Low back disorders are common, especially among individuals who repeatedly perform lifting and bending tasks. Low back pain is experienced by 60-70% of adults within their lifetime and is a leading cause for missed work. For some use cases, quasi-passive, lift-assist exosuits can provide a convenient way to offload the back and decrease effort. For instance, these exosuits may have an elastic band connected from a dual-mode clutch on the upper back down to the thighs. With the clutch mechanism in engaged mode, the elastic bands stretch and provide an assistive torque while lifting. With the clutch mechanism disengaged, the exosuit allows for full and unobstructive range of motion. In some current versions of these exosuits, the user toggles between modes manually. Alternatively, the exosuit could automatically control its clutch modes. This requires an electronic system that monitors when lifting assistance is needed and electronically switches modes.

Typically measuring displacement and force within a device requires two separate sensors. These force sensors are typically either heavy/bulky (e.g., load cells) or they are inaccurate/unreliable (e.g., force-sensitive resistors). Multiple sensors can also increase power consumption, which limits battery life of the wearable device. It would be desirable to have a clutch mechanism that addresses these disadvantages of existing devices for measuring displacement and force.

SUMMARY

According to one aspect of the present disclosure, a clutch mechanism includes a spool that is configured to receive a cable, a disk with elasticity, a mechanism configured for locking and unlocking the movement of the disk, and at least one sensor for measuring the movement of at least one of the disk and the spool in the unlocked mode and for measuring the movement of the spool relative to the disk when in a locked mode.

According to a configuration of the above implementation, the disk has rotational elasticity. The mechanism is configured for locking and unlocking the disk for rotational movement. The at least one sensor is for measuring the rotational movement of at least one of the disk and the spool in the unlocked mode and for measuring the rotational movement of the spool relative to the disk when in a locked mode.

According to another configuration of the above implementation, the disk includes an inner ring, an outer ring, and a plurality of spokes extending therebetween.

According to a configuration of the above implementation, the outer ring of the disk includes an exterior surface. The exterior surface of the outer ring forms a plurality of detents. In one embodiment, the plurality of detents is from about 10 to about 180, or from about 20 to about 100.

According to another configuration of the above implementation, the clutch mechanism further includes a spool cap in which the spool cap is located between the disk and the spool.

According to a configuration of the above implementation, the clutch mechanism further includes a spring mechanism. The spring mechanism is received into an opening formed in the spool. The spring mechanism may include a power spring.

According to another configuration of the above implementation, the mechanism configured for locking and unlocking the disk for movement includes at least one ball bearing, at least one cam plunger, and at least one solenoid.

According to a configuration of the above implementation, the mechanism configured for locking and unlocking the disk for movement includes a plurality of ball bearings, a plurality of cam plungers, and a plurality of solenoids.

According to another configuration of the above implementation, the at least one solenoid is a pull latching solenoid.

According to a configuration of the above implementation, the at least one sensor is a magnetic sensor, and the clutch mechanism further includes a magnet.

According to another configuration of the above implementation, the clutch mechanism further includes the cable. The spool forms a groove on an exterior surface thereof for receiving the cable.

According to a configuration of the above implementation, the clutch mechanism further includes a support plate with at least one axis extending outwardly therefrom. The support plate may include a plurality of axes extending outwardly therefrom.

According to one aspect of the present disclosure, a clutch mechanism includes a spool that is configured to receive a cable, a disk with rotational elasticity that includes a plurality of detents formed on an exterior surface thereof, a spring mechanism being received into an opening formed in the spool, at least one ball bearing, at least one cam plunger, at least one solenoid, and at least one sensor for measuring the rotational movement of at least one of the disk and the spool in the unlocked mode and for measuring the rotational movement of the spool relative to the disk when in a locked mode.

According to a configuration of the above implementation, the plurality of detents, the at least one ball bearing, the at least one cam plunger, and the at least one solenoid assist in unlocking and unlocking the disk for rotational movement.

According to a configuration of the above implementation, the disk includes an inner ring, an outer ring, and a plurality of spokes extending therebetween.

According to one aspect of the present disclosure, a wearable assist device is in combination with a clutch mechanism. The clutch mechanism includes a spool that is configured to receive a cable, a disk with elasticity, a mechanism configured for locking and unlocking the movement of the disk, and at least one sensor for measuring the movement of at least one of the disk and the spool in the unlocked mode and for measuring the movement of the spool relative to the disk when in a locked mode.

According to one aspect of the present disclosure, a method of using a clutch mechanism includes providing a spool configured to receive a cable, a disk with elasticity, a mechanism configured for locking and unlocking the movement of the disk, and at least one sensor. Movement of the at least one of the disk and spool in the unlocked mode is measured via the at least one sensor. Movement of the spool relative to the disk when in a locked mode is measured via the at least one sensor.

The above summary is not intended to represent each embodiment or every aspect of the present invention. Additional features and benefits of the present invention are apparent from the detailed description and figures set forth below.

BRIEF DESCRIPTION OF DRAWINGS

Other advantages of the invention will become apparent upon reading the following detailed description and upon reference to the drawings in which.

Figure 1A:
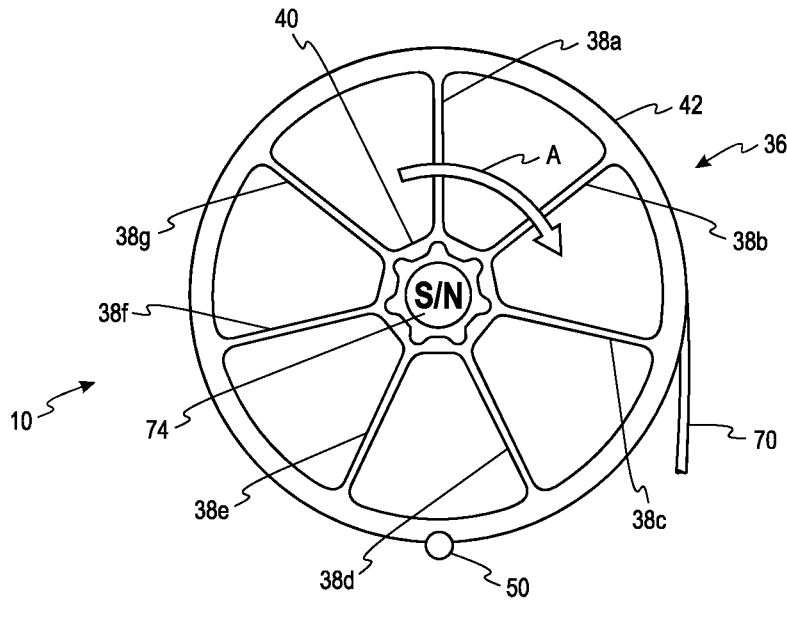
FIG. 1A is a side view of a portion of a clutch mechanism in a locked or engaged mode according to one embodiment.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

This application describes a clutch mechanism with integrated force and motion sensing. This clutch mechanism can be used in assistive devices, rehabilitative devices, or wearable devices. Non-limiting examples include, but are not limited to, wearable assist devices such as exoskeletons, exosuits, prostheses, or orthoses. A clutch mechanism is a device that engages and disengages a mechanical power, force, or motion transmission. Clutch mechanisms can switch between two or more modes. For example, mode switching may include engaging and disengaging assistance, or changing how power, force or motion are transmitted through a clutch mechanism.

The clutch mechanism may be used in powered, quasi-passive, or passive assistive devices (i.e., in which electrical power is used only for sensing, but not to apply or control physical assistance).

One inventive aspect is that a single sensor (e.g., encoder) is adapted to assist in measuring both the displacement and the force going through the clutch mechanism. This reduces the size, weight, complexity, and electrical power demands for an instrumented clutch mechanism. Another inventive aspect of this invention is that this integrated clutch sensing in one embodiment may be used (alone or with other sensors or data) to estimate how much an assistive device reduces biomechanical loading, damage, or injury risk to the wearer. This information may be used for real-time biofeedback, safety monitoring, or device-control purposes.

In one embodiment, a single sensor (e.g., a magnetic encoder) in conjunction with a compliant mechanism (e.g., an elastic element) is used to measure both force and displacement. This allows the single sensor in conjunction with the compliant mechanism to be smaller and lighter with less complexity and electrical power demands.

One embodiment of a clutch mechanism is shown in FIGS. 1-5. The clutch mechanism shown has two potential separate clutches that can be locked/unlocked and sensed independently of each other. FIGS. 1-5 depict one clutch being used, while FIG. 6 depicts two clutches. Each of these clutches operates in the same way. When a clutch mechanism is unlocked, a spool stack can rotate. When a clutch mechanism is locked, a spool stack cannot rotate. FIG. 1A shows a portion of clutch mechanism 10, which is in a locked/engaged mode or position. FIG. 1B shows a portion of the clutch mechanism 10, which is in an unlocked/disengaged mode or position. The clutch mechanism 10 of FIGS. 1A, 1B is shown with a cable 70 and a magnet 74. The clutch mechanism 10 rotates in a clockwise direction of Arrow A in FIG. 1B. The clutch mechanism 10 of FIG. 1A is prevented or inhibited from rotating in the direction of Arrow A by a ball bearing 50.

Figure 2:
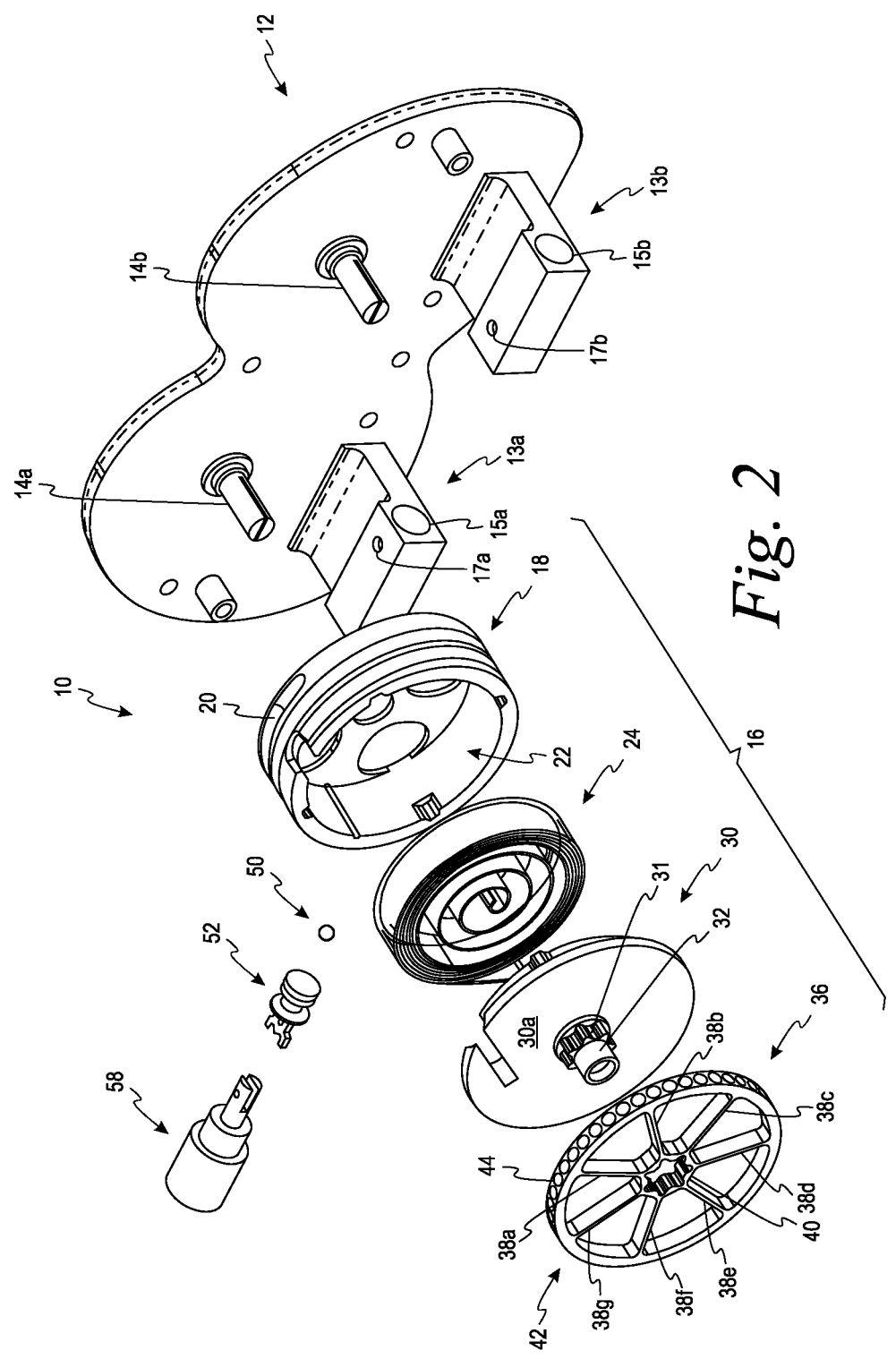
FIG. 2 is an exploded perspective view of the entire clutch mechanism of FIG. 1 with one spool stack according to one embodiment.
Figure 3:
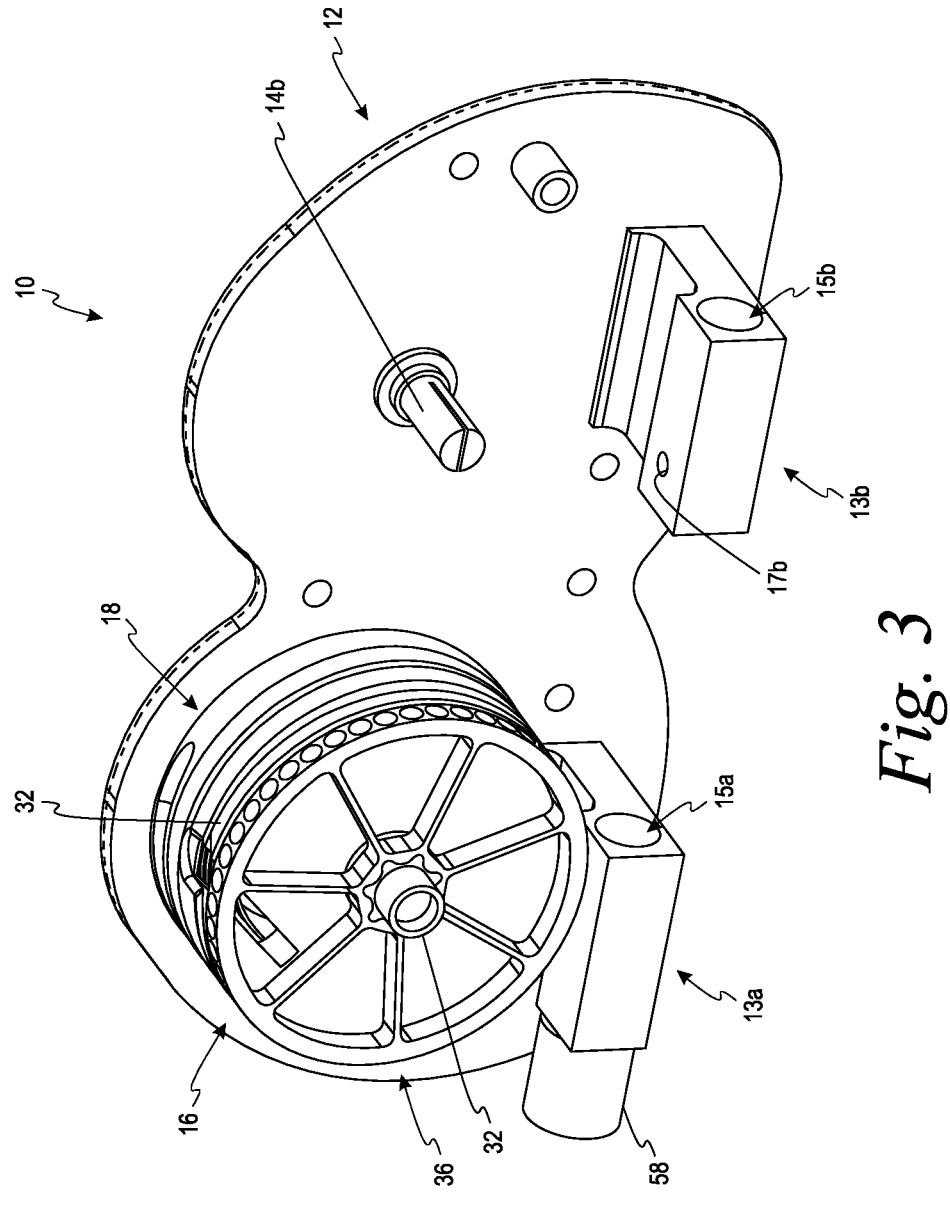
FIG. 3 is a front perspective view of the assembled clutch mechanism of FIG. 2.
Figure 4B:
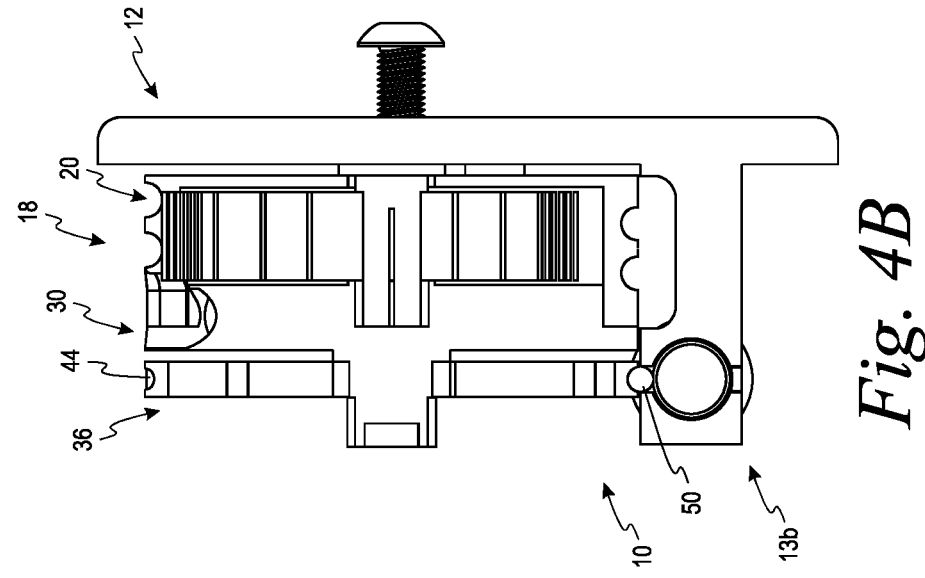
FIG. 4B is a generally cross-sectional view of the assembled clutch mechanism of FIG. 2 taken generally along a line down the center of the spool stack along its length.
Figure 4A:
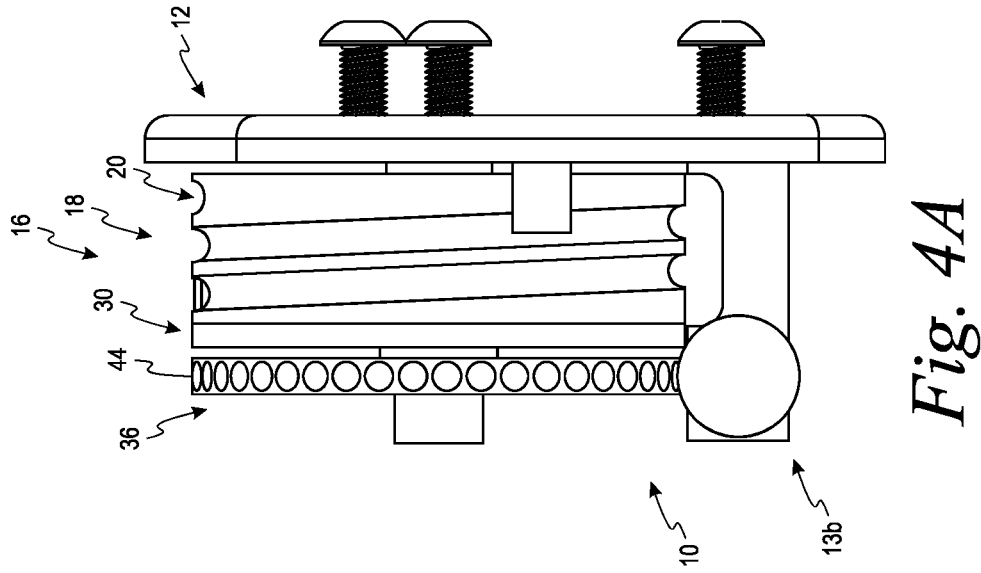
FIG. 4A is a side view of the assembled clutch mechanism of FIG. 2.
Figure 5A:
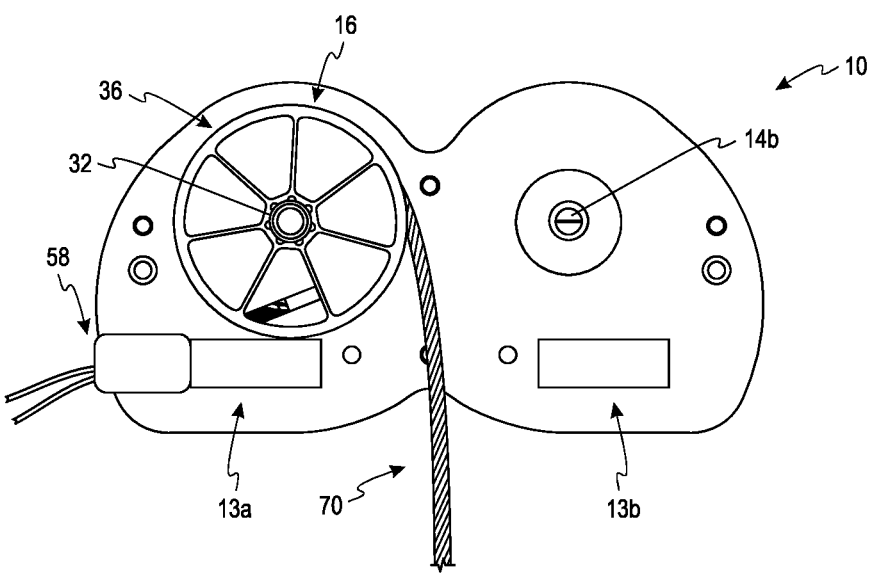
FIG. 5A is a front view of the clutch mechanism of FIG. 3 with a spool stack populated according to one embodiment.
Figure 5B:
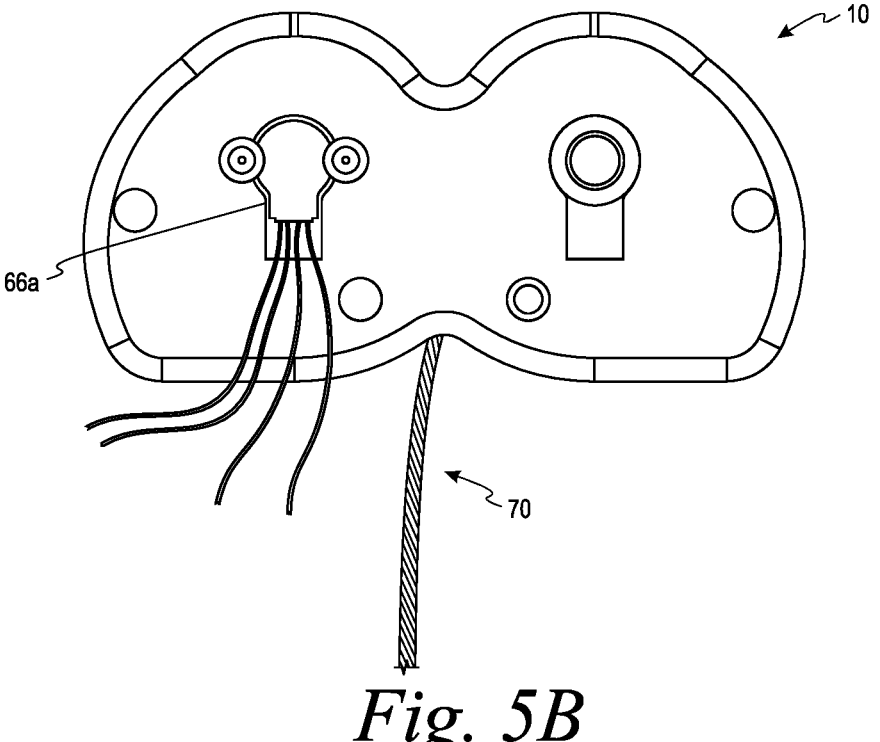
FIG. 5B is a back view of the clutch mechanism of FIG. 3.

FIGS. 2-5 shows a plurality of different views of the clutch mechanism 10. FIG. 2 is an exploded perspective view of the clutch mechanism 10, while FIG. 3 shows a front perspective view of the clutch mechanism 10 in an assembled position with one spool stack 16. FIG. 4A shows a side view of the clutch mechanism 10 in an assembled state, while FIG. 4B shows a cross-sectional view of the clutch mechanism 10. FIG. 5A is a front view of the clutch mechanism 10 in an assembled position with one spool stack 16, while FIG. 5B is a back view of the clutch mechanism 10 in an assembled position with one spool stack 16.

Referring back to FIG. 2, the clutch mechanism 10 includes a support plate 12, a spool 18, a spring mechanism 24, a spool cap 30, a disk 36 (e.g., a sprocket with detents), the ball bearing 50, a cam plunger 52, and a solenoid 58. The spool stack 16 of FIG. 2 includes the spool 18, the spring mechanism 24, the spool cap 30, and the disk 36. When the clutch mechanism 10 is locked, the spool stack 16 cannot rotate. The spool stack 16 rotates around an axis 14a that extends outwardly from the support plate 12. Another axis 14b is shown extending outwardly from the support plate 12 and functions the same as axis 14a and is configured to receive another spool stack (not shown in FIG. 2).

The spool 18 is generally circular shaped and forms a groove 20 on an exterior surface thereof. The groove 20 is sized and shaped to receive the cable 70 (shown in FIGS. 1A, 1B). The groove 20 assists in winding/unwinding the cable 70 when the clutch mechanism 10 is in the unlocked or disengaged position. The spool 18 forms an interior opening 22 that is sized and shaped to receive a spring mechanism 24. The spool 18 is generally from about 1.5 to about 2.5 inches in diameter. The spool stack 16 can generally wind up a maximum of about 12 inches of cable. The cable may comprise braided steel, wire rope, Kevlar line, synthetic rope (e.g., Dyneema), paracord, or other materials.

The spring mechanism 24 in one embodiment is a power spring, which is also known as a rotor spring. The spring mechanism 24 limits slack in the cable 70 by maintaining a small but consistent amount of torque on the spool 18 (like a keychain retractor). This occurs in the disengaged mode. It is contemplated that other types of springs or elastic elements may be used instead of the rotor spring in other embodiments. For example, an extension spring, a compression spring, an elastomer, an elastic fabric, or an air spring may be used. It is contemplated that other types of spring-retraction element or mechanism may be used or the spring may be removed completely while retaining the dual motion and force-sensing functions or capabilities of the system. In certain embodiments, gravity or other mechanisms could replace the function of a spring to maintain a small amount of tension through the spool or system.

The disk 36 in this embodiment is a sprocket with a plurality of detents. Specifically, the disk 36 includes a plurality of spokes 38a-38g that extends outwardly from an inner ring 40 and extend until reaching an outer ring 42. The inner ring 40 rotates with the spool 18. It is contemplated that the number of spokes may vary from that shown in FIGS. 1A, 1B and 2. The outer ring 42 forms a plurality of detents 44 on an outer surface thereof. The number of detents in this embodiment is 45 detents, which allows the spool stack to be locked every 8 degrees. It is contemplated that the number of detents may be less or more than shown. In one embodiment, the number of detents is from about 10 to about 180 based on the angular locking resolution desired. In another embodiment, the number of detents is from 20 to about 100, or from about 30 to about 60.

The disk 36 sits on an exterior surface 30a of the spool cap 30 and is received by a projection 31 extending from the exterior surface 30a. The disk is coupled to the spool 18. The projection also includes a cap 32 that is configured to receive and hold the magnet 74 (see FIGS. 1A, 1B).

If the clutch mechanism 10 is locked, the center of the disk 36 and the remainder of the spool stack 16 can slightly rotate, but the outer ring 42 of the disk 36 is fixed. In the locked or engaged mode, the length of the unspooled cable 70 is fixed. This rotation or angular displacement is proportional to the amount of torque on the clutch mechanism 10, which is proportional to the pulling force through the cable 70. Thus, the disk 36 sitting on the spool cap 30 has a certain amount of rotational elasticity due to the plurality of spokes 38a-38g acting as a series elastic element (i.e., a compliant mechanism). The plurality of spokes 38a-38g of the disk 36 acts as a series of elastic elements that deflect rotationally and in proportion to the force exerted by the cable 70 and the elastic bands.

In one embodiment, the cable 70 is attached to a series of elastic bands. In this embodiment, the elastic bands may run over the back and buttocks, and connect down to sleeves on the thighs. When the user bends forward, the elastic bands stretch, which creates an assistive extension moment about the lower back. In this embodiment, this deflection is proportional to the amount of load on the cable 70 and the amount of lifting assistance being provided to the user by the attached elastic band.

A single sensor 66a (see FIG. 5B) (i.e., a magnetic encoder in this embodiment) along with the compliant mechanism design allows this clutch mechanism to measure both displacement of the cable 70 in the unlocked mode of the clutch mechanism 10 and the force in the cable 70 in the locked mode of the clutch mechanism 10.

The sensor 66a measures this spoke deflection as rotation of the spool stack 16 about the center axis, allowing exosuit force to be calculated. This rotational deflection increases with torque magnitude. In summary, a single sensor along a center axis in this embodiment can estimate the user's posture (trunk-hip flexion angle) in a disengaged mode and an exosuit assistance force in engaged mode.

When the clutch mechanism 10 is in the disengaged mode, the outer ring 44 is unlocked and can rotate as a user moves. The spool rotation will increase with trunk and hip flexion. Measurements from the sensor 66a may be used to calculate the displacement of the cable 70 being let out when the spool stack 16 rotates in the unlocked state.

Figure 1B:
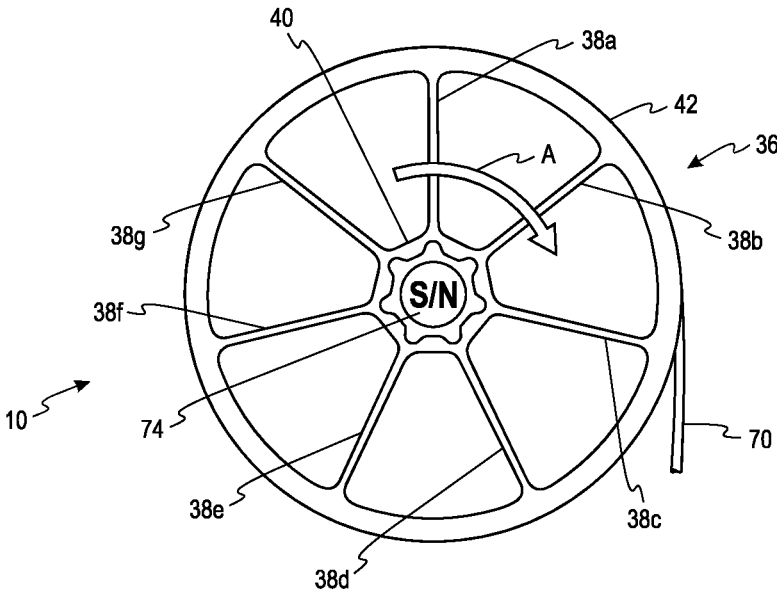
FIG. 1B is a side view of the clutch mechanism of FIG. 1A in an unlocked or disengaged mode.

The sensor 66a (e.g., magnetic encoder in this embodiment) is placed above the center axis of the spool stack 16 (see FIG. 5B), and the magnets 74a, 74b is placed on the end of the center axis as shown in FIGS. 1A, 1B. This positioning allows the sensor 66a to measure the axis rotation when the clutch mechanism 10 is disengaged. It is contemplated that other positioning may be used with respect to the sensor and the magnet.

In certain embodiments, the sensor or encoder may be aligned with the center axis of the spool stack to measure spool rotation and cable displacement. In other embodiments, the sensor or encoder can be aligned with a different axis. For instance, the spool may be connected via a belt or other transmission to another rotating spool or pulley, and the sensor or encoder could thereby measure rotation about that different axis. Alternatively, the cable may run over an additional, separate pulley, such that the sensor measures cable displacement about that separate axis, which differs from the center axis of the spool stack. In certain embodiments, the sensor is linear (e.g., measuring strips embedded or etched onto the cable). The sensor may be optical or magnetic or replaced with another sensor capable of measuring linear or angular displacement.

In one embodiment, a 1024 pulses per revolution rotary sensor or encoder may be used to read the rotation off a magnet. It is contemplated that there are other sensors that may be used instead of the magnetic encoder. For example, a non-magnetic encoder, a rotational potentiometer, or a hall effect sensor may be used in certain configurations.

The cable 70 may be made of different materials and thicknesses, but typically comprises a metallic material or synthetic rope. One non-limiting example of a metallic material is steel. For example, the cable may be a ⅛-inch steel cables.

To engage the clutch mechanism 10 in this embodiment, the solenoid 58 of FIG. 2 retracts the cam plunger 52, which pushes the ball bearing 50 into one of the plurality of detents 44, locking its rotation. To disengage the clutch mechanism 10, the solenoid 58 extends the cam plunger, which removes the ball bearing 50 from one of the plurality of detents 44, allowing the disk 36 to rotate.

The clutch mechanism may be switched between engaged and disengaged modes by a microcontroller. Thus, more specifically, the solenoid 58 of the clutch mechanism 10 may be controlled by a microcontroller. Mode switching is performed when the microcontroller activates a solenoid that pushes a ball bearing in or out of a detent formed on an outer ring of the disk locking or unlocking its rotation. One non-limiting microcontroller that may be used is a dsPIC33 microcontroller. It is contemplated that other microcontrollers may be used. A microcontroller for the solenoid 58 is in the electronics, which may be, for example, in a shoulder harness 200 of FIGS. 8A, 8B.

In one non-limiting example a pull latching solenoid is used. It is contemplated that other solenoids may be used such as a pulled tubular solenoid, push tubular solenoid, or rotary solenoid, or other types of actuators such as an electric motor may be used.

As shown best in FIGS. 2 and 3, a plurality of brackets 13a, 13b is shown that is formed with or attached to the support plate 12. Each of the brackets 13a, 13b forms a respective opening 15a, 15b that is sized and shaped to receive a respective cam plunger 52 and solenoid 58. Each of the brackets 13a, 13b forms a respective smaller opening 17a, 17b that is sized and shaped to receive a respective ball bearing 50. More specifically, the smaller openings 17a, 17b are sized such that the ball bearing 50 can extend at least partially through to engage with a respective one of the detents 44 of the disk 36. The brackets 13a, 13b are shaped with a carve-out that allows space for the spool 18 and cable 70 to rotate freely.

Figure 6A:
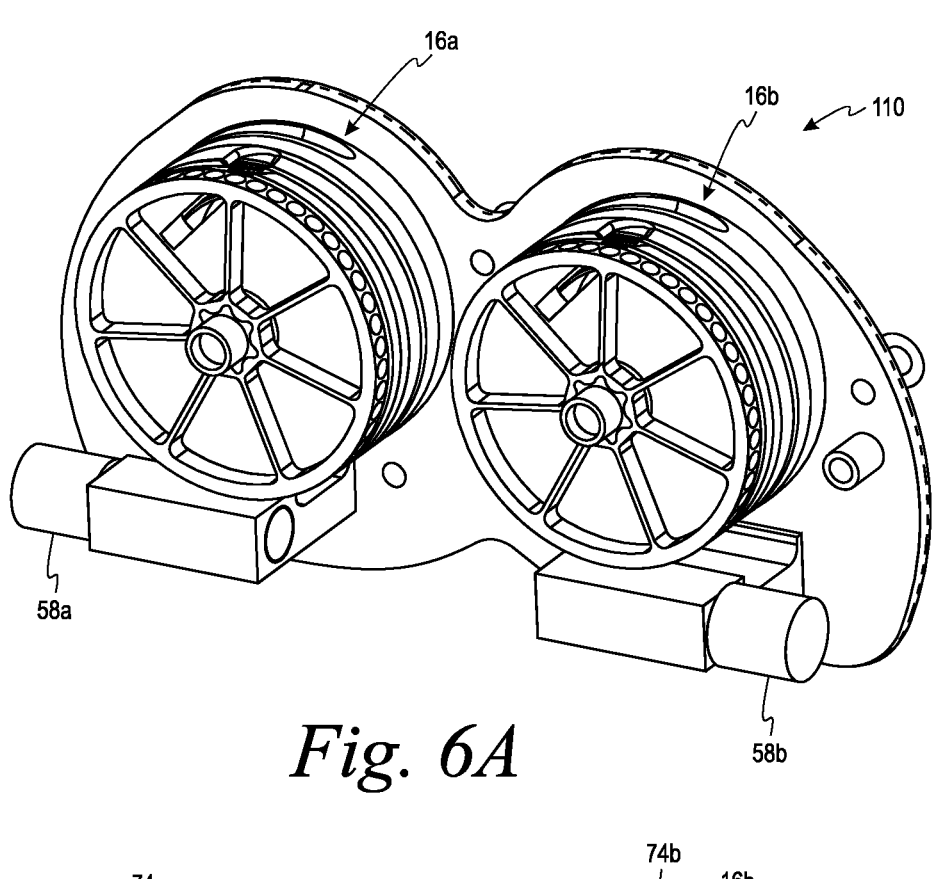
FIG. 6A is a front perspective view of a clutch mechanism with two spool stacks and two solenoids according to another embodiment.
Figure 6B:
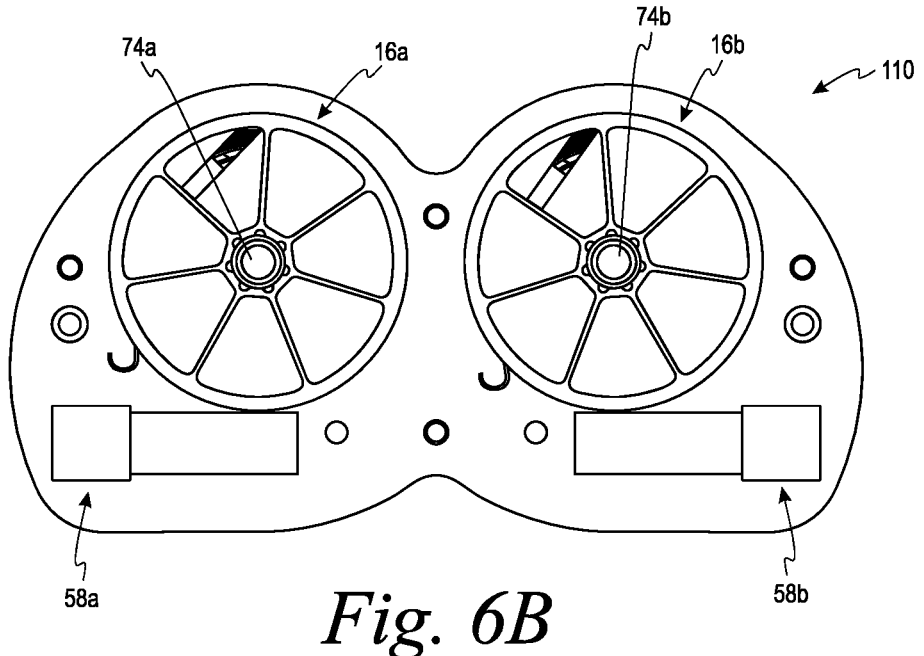
FIG. 6B is a back view of the clutch mechanism of FIG. 6A.

In another embodiment, a clutch mechanism 110 is shown in FIGS. 6A, 6B. The clutch mechanism 110 includes two spool stacks 16a, 16b. The spool stacks 16a, 16b are the same as the above-described spool stack 16. The clutch mechanism 110 also includes two ball bearings, two cam plungers and two solenoids 58a, 58b. The two ball bearings and the two cam plungers in the clutch mechanism 110 are the same as described above with the ball bearing 50 and the cam plunger 52. The two solenoids 58a, 58b are the same as described above with solenoid 58. Thus, the clutch mechanism 110 is the same as the clutch mechanism 10 except for the additional spool stack, ball bearing, cam plunger and the solenoid.

By independently controlling a solenoid for two or more different spool stacks such as in FIG. 6A, 6B, additional different modes may be achieved. For example, in this embodiment, different modes may be obtained by locking both spool stacks 16a, 16b, neither spool stacks, only the left spool stack 16a, or only the right spool stack 16b. By utilizing electric solenoids to operate the clutch mechanism, a microprocessor with a sensor-feedback control scheme can toggle the clutch mechanism on/off rather than requiring manual input from the user. This also works in the clutch mechanism 10 of FIGS. 1-5, but with only two specific modes.

Figure 7A:
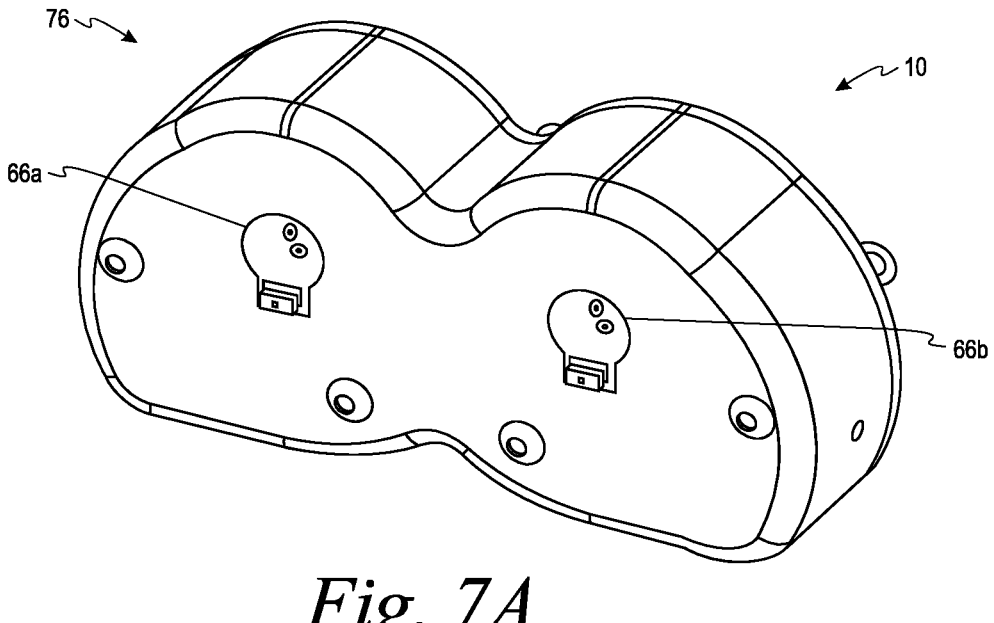
FIG. 7A is a back perspective view of the clutch mechanism of FIG. 6A with a cover according to one embodiment.
Figure 7B:
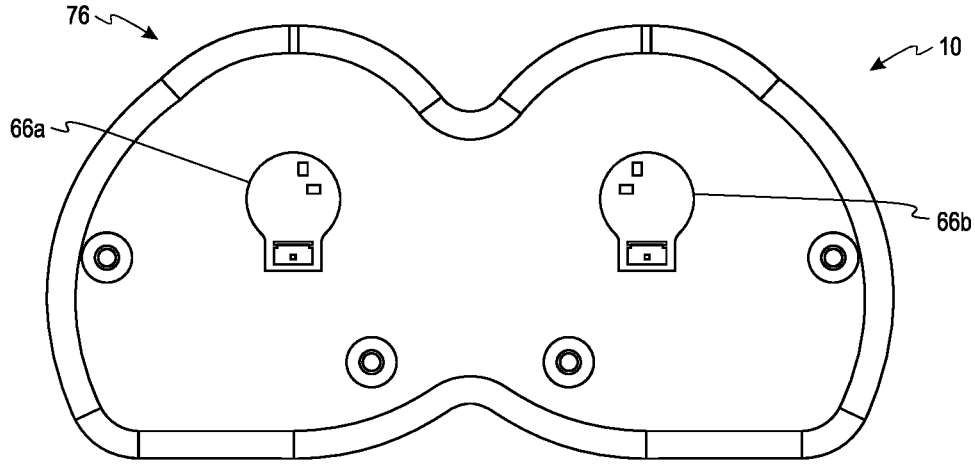
FIG. 7B is a back view of the clutch mechanism of FIG. 7A.

The clutch mechanisms 10, 110 of the present invention may include a cover. For example, referring to FIGS. 7A, 7B, the clutch mechanism 110 is enclosed by a cover 76. FIG. 7A is a front perspective view of the clutch mechanism 110 and the cover 76, while FIG. 7B is a back perspective view of the clutch mechanism 110 and the cover 76. FIGS. 7A, 7B also show a plurality of sensors 66a, 66b (e.g., magnetic encoders). A cover (such as cover 76) may also be used with the clutch mechanism 10.

One non-limiting size of a clutch mechanism is from about 7.5 cm by about 15 cm. The outer cover is generally from about 3 cm to about 5 cm. The clutch mechanism is desirably lightweight (less than about 0.9 kg) and also desirably has a low profile (a height less than 5 cm). The overall footprint of the clutch mechanism can vary, but may range from about a quarter of the size dimensions summarized to about double these size dimensions (i.e., from about 2 cm to about 30 cm).

The clutch mechanism 10 in one embodiment would include associated electronics for power and data logging or transmission.

It is contemplated that there are many other variations and embodiments of the clutch mechanism. It is contemplated that the clutch mechanism may be built in many different sizes, shapes, and materials. For instance, a clutch mechanism may be designed to meet load-bearing requirements needed in a locked state and the amount of displacement or force required from the spring in an unlocked state. The clutch mechanism is shown as being a rotational clutch. It is contemplated that the clutch mechanism in other configurations may be a linear or translational clutch.

In another embodiment, a clutch mechanism may be replaced or augmented with other actuators or motors. For example, the clutch mechanism may be replaced with an electric motor, or an electric motor in series with a clutch. While motor current or sensors affixed in or on the motor may also be used to estimate force, these sensors or signals can be limited in certain circumstance such if a clutch is in series with the motor and is in a locked state. In this case, the motor current would no longer correspond with force through the device. However, the invention here would allow for this force to still be measured without a separate force sensor (e.g., load cell) in series with the motor or mechanical transmission, which reduces size, weight and complexity. Additionally, if the motor is in series, then in certain situations the sensor or encoder could also be used for motor control instead of an additional sensor or encoder on the motor.

It is contemplated that there are other ways for the clutch mechanism to lock and unlock. For example, the clutch mechanism may be locked and unlocked using a ratchet and pawl system, a friction clutch, a dog clutch, an overrunning clutch, or an electrostatic clutch. Thus, the outer edge of the sprocket need not be detents, but could alternatively be smooth and used with a friction cam clutch, or could be gear teeth used with a pawl of pin. It is contemplated that other clutch or type of mechanisms may engage and disengage a mechanical transmission.

It is contemplated that there are other methods for locking or unlocking the clutch mechanism using either powered or passive elements. For instance, the solenoid may be replaced with an electric motor controlled by a digital signal (powered) or with a manual switch that a user has to toggle (passive).

It is contemplated that additional sensors or encoders may also be added. These sensors may be integrated directly into the clutch electronics or integrated separately. For example, an inertial measurement unit (IMU) may be added (e.g., mounted onto the cover) to monitor the motion or orientation of the clutch (and the body segment it is affixed to) in 3D space. It is contemplated that another sensor could be added to monitor which state the clutch is in (e.g., locked vs. unlocked). Although in some embodiments (such as the one shown here with a solenoid), this clutch state can already be ascertained. Data from these sensors can be combined with force or displacement data computed from the encoder to estimate force/torque provided by an assistive device, or effects on biomechanical load, damage, or injury risk to the person wearing the clutch mechanism.

In certain embodiments, only a sensor or encoder (or equivalent spool rotation or cable displacement sensor) is used to estimate body posture. In some embodiments, the spokes serve as series elastic elements whose rotational deflection under load is measured using a sensor or encoder. However, this series elastic element may also be implemented in other ways that do not involve spokes, and whose displacement, be it linear or rotational, is measured by a sensor to estimate force of the clutch mechanism. For instance, the back plate itself may have series elastic elements built into it, which deform or displace relative to the upper-body interface when the clutch mechanism is engaged and applies a force.

In certain embodiments, a sensor or encoder (or equivalent spool rotation or cable displacement sensor) and one inertial measurement unit (IMU) on the upper body interface are used to estimate body posture. For instance, the IMU may be used to estimate the absolute orientation of the user's trunk (where the upper body interface is worn) and the sensor can be used to estimate the trunk relative to the thigh angle. Then, by combining these two estimates (trunk angle and trunk-to-thigh angle), the absolute thigh angle can be estimated, without actually requiring a sensor on the thigh. In certain embodiments, there is a single sensor to measure the angle between the trunk and the most flexed thigh. In other embodiments, there are two or more sensors on two or more axes that separately measure the angles between the trunk and the right thigh, and between the trunk and the left thigh.

In certain embodiments, a sensor or encoder (or equivalent spool rotation or cable displacement sensor) and more than one IMU is used to estimate body posture. Additional IMUS might be located on the upper body interface, lower body interface (e.g., thigh sleeves), or on other parts of the user's body such as on the arms, legs, feet, wrist, head, or waist to allow more comprehensive measurements of the user's posture or movement.

In certain embodiments, only a sensor or encoder (or equivalent spool rotation or cable displacement sensor) is used to estimate force from the device. Various alternative sensors may be used instead of or in combination with the sensor. These other sensors include, for example, a strain gauge, force-sensitive resistor, pressure sensor, or load sensor. There are various potential reasons or uses for other sensors such as to circumvent environments with electromagnetic interference or use redundant sensing to improve force measurement accuracy. In certain embodiments, a strain gauge may be positioned on the center axis of the spool stack, or on one or more spokes of the sprocket, or between the backplate and the upper-body harness, or on the solenoid mounting to the backplate, or in series with the cable, or elsewhere along the load path from the lower-body interface to the upper-body interface. When the clutch is engaged and the device is exerting a force on the user, the strain gauge (or equivalent force or pressure sensor) would measure a signal that increases with and could be calibrated to the applied force. In certain embodiments using a strain gauge on other components, the spokes in the sprocket would be optional or unnecessary.

In certain embodiments, a Hall effect sensor (or equivalent sensor capable of measuring displacement) can be used with a spring (or any material undergoing elastic deformation) to estimate force from the device. This sensor could be configured to measure rotational or linear displacements of the spring, which correspond with forces exerted by the device. For instance, the spokes of the sprocket could serve as the spring element and the Hall effect sensor can be configured to measure angular displacements that increase with increasing force from the device. Alternatively, a compression or extension spring could be inserted between the center axis and the back plate, or between the back plate and the upper-body harness, and the Hall effect sensor could be configured to measure linear displacements that increase with increasing force from the device.

In certain embodiments, the sensor or encoder (or equivalent spool rotation or cable displacement sensor) may be used in engaged clutch mode to simultaneously estimate both the force from the clutch mechanism and the user's posture. In this case, the stiffness profile of the elastic bands (which are in series with the cable) may be used in combination with the sensor measurements to estimate the trunk-to-hip angle of the user.

In one embodiment, a tether connects a microcontroller to a laptop (for logging data) and power supply (for powering the microcontroller and the solenoid). Data logging may also be on-board the wearable system (e.g., SD card) or done wirelessly (e.g., with telemeter, Bluetooth). The power supply may also be on-board the wearable system from a battery in another embodiment. The data logging and power may be embedded onto an electronics board located inside of the housing of the mechanism.

The data collected may be fed back to a laptop, phone or other display to summarize user movement and posture data, and information about device engagement/disengagement and forces exerted. The data collected by this clutch mechanism may also be used as an input to a machine learning or adaptive control model that creates or modifies the control behavior of the device to better coordinate with the user.

Methods of Use

Several exemplary methods of use are described below, which could be used for real-time biofeedback, safety monitoring, device control, or other applications.

The clutch mechanisms may be used in existing wearable assist devices called exos (exoskeletons and exosuit) that reduce risk factors of lower back disorders. Exos encompass a broad array of devices, including devices that are powered robotic, purely passive and quasi-passive. It can also be used in prosthesis or orthosis.

Figure 8A:
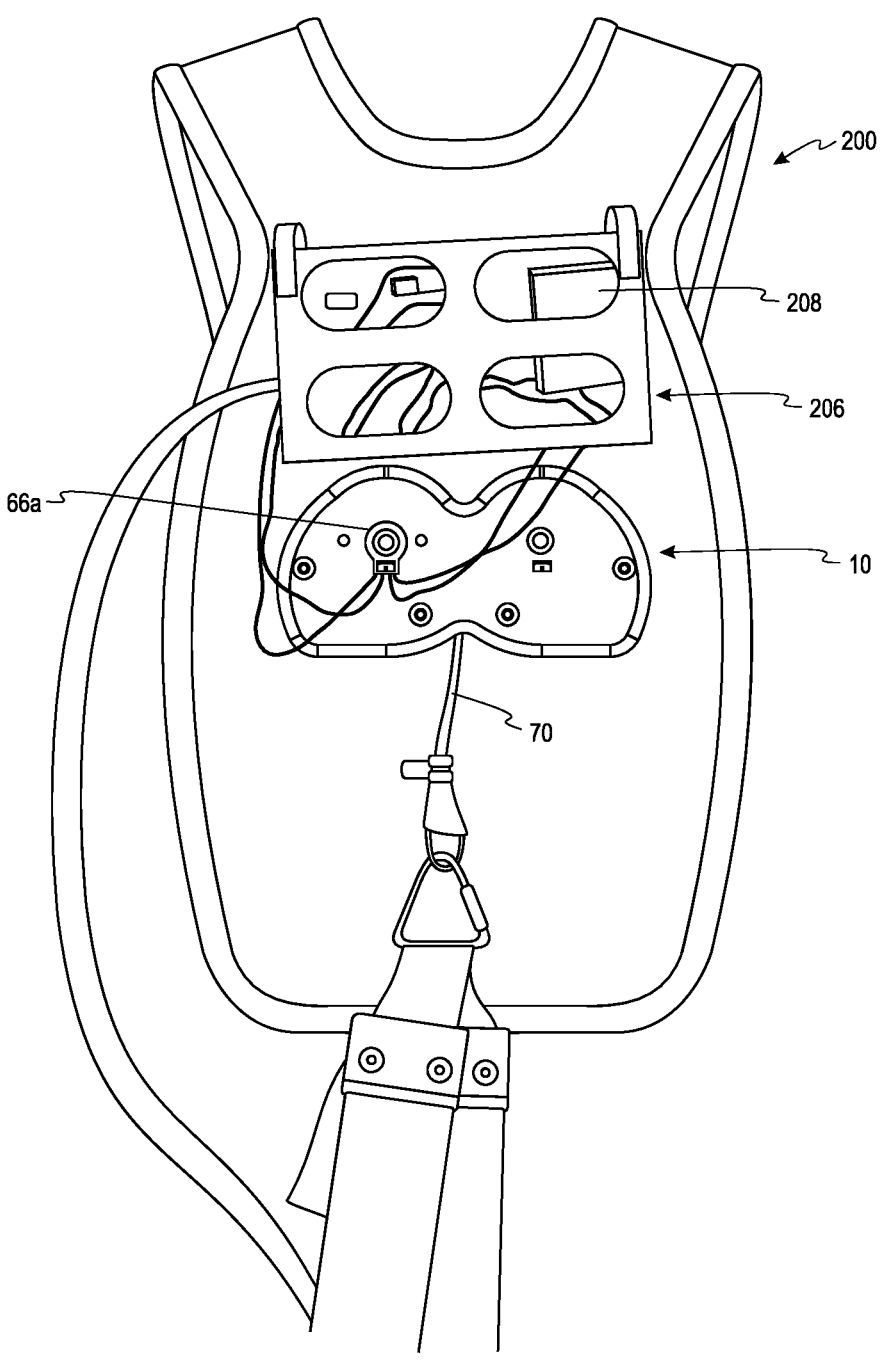
FIG. 8A is a front view of the clutch mechanism of FIG. 3 with a shoulder harness according to one embodiment.
Figure 8B:
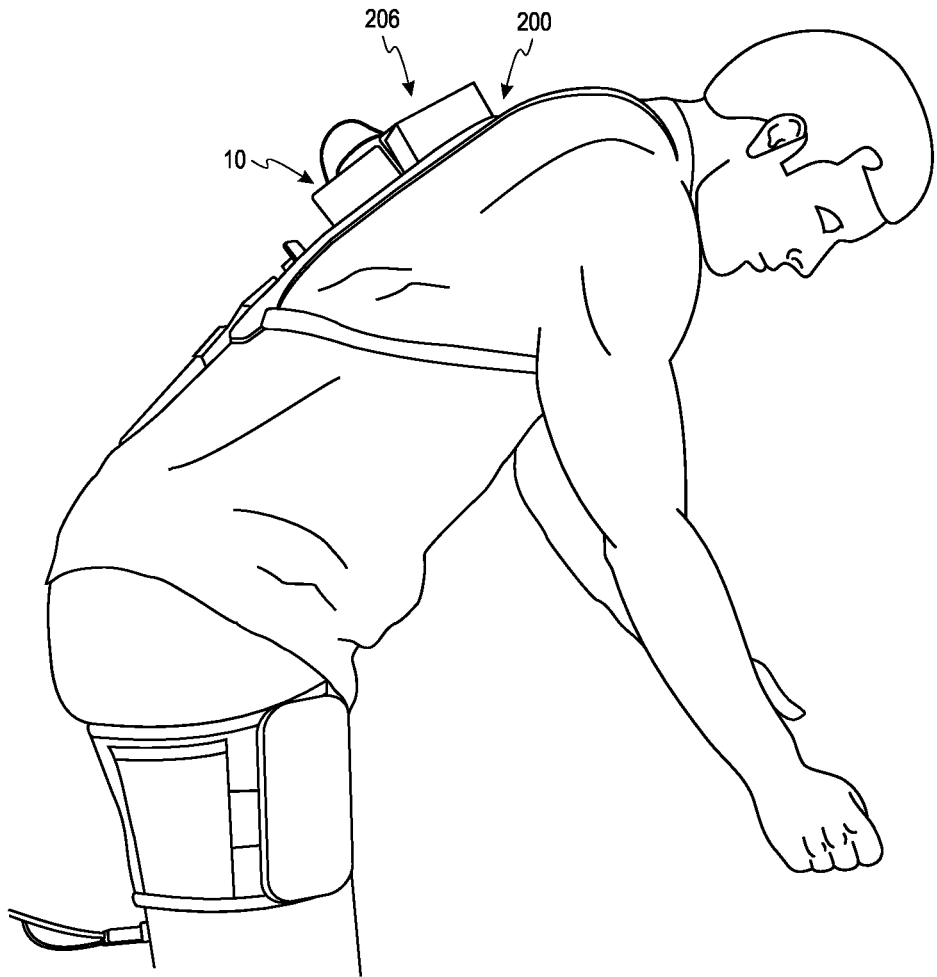
FIG. 8B is a side view of the clutch mechanism and the shoulder harness of FIG. 8A on an individual.

Referring to FIGS. 8A, 8B, the clutch mechanism 10 is attached to a back center of a shoulder harness 200. The shoulder harness 200 is worn like a backpack on a user. The shoulder harness 200 also includes an electronic box 206 attached thereto. The electronic box 206 may include components to estimate trunk orientation. For example, the electronic box 206 may include an inertial measurement unit (IMU) 208 that tracks 6-axis acceleration and gyroscope signals to estimate truck orientation. The IMU may also be used as an input to a mode-switching controller. The electronic box may also include batteries and data storage.

In one embodiment, the engaged mode of a quasi-passive back exo should assist a user's back and hips during lifting and bending. This mode may also be referred to as assistance mode. In the engaged mode, it is also desirable to measure the level of the assistance (e.g., back assistance). In this mode, torque is applied to the locked clutch as the elastic band stretches. The spokes of the clutch mechanism deform, creating a slight rotation read by the sensor or encoder.

In one embodiment, in the disengaged mode of a quasi-passive back exo should allow unobstructed trunk and hip flexion. This mode may also be referred to as transparent mode. In the disengaged mode, it is also desirable to measure trunk and hip flexion. The cable unspools from the clutch mechanism as the spring translates. The rotation of the clutch spool displacement is read by the encoder.

A control signal based on a sensor (e.g., trunk IMU) is sent to the solenoid. For example, a 3.3. V pulse controls the power source (e.g., 12V).

The mode switching between the engaged and disengaged states should be performed quickly. For example, the mode switching can be performed using a sensor in, for example, less than one second. It is desirable to increase the versatility of control (i.e., the number of different inputs that could control mode switching). It is desirable for the clutch mechanism to be able to support at least 350 N of force in the engaged mode and in the disengaged mode, the user desirably experiences less than 32 N of force. In the disengaged state, this would give a desired freedom of movement.

One method of use for this clutch mechanism is to use the force data to monitor the magnitude of device assistance (e.g., force or torque) provided to the user.

Another method of use is to compute the distribution of time when a user is receiving assistance versus not receiving assistance (e.g., when the force sensor reads above or below a given threshold), or is in engaged versus disengaged mode. The sensor may also be used to track at which set points the clutch mechanism is engaged to provide further insight on how a person is using the device.

Another method of use is to combine the instrumented clutch force data with anthropometric, geometric, and/or biomechanical data to estimate the amount of offloading an assistive device provides the wearer. For instance, if the device provides an assistive force 10 cm away from a joint whereas the person's muscles are 5 cm away (i.e., moment arm about a given biological joint), then multiplying the device force by the ratio of the device moment over the biological muscle arm provides an estimate of how much force is offloaded from the muscle.

Another method of use would be to combine the instrumented clutch force data with data from one or more IMUs that tracks body-segment motion. For instance, lumbar (low back) loading is correlated with trunk inclination (bending angle in the sagittal plane), which can be monitored with an IMU mounted on the trunk. Thus, trunk inclination may be used to estimate force on the low back (e.g., muscles or spine). And the instrumented clutch force data (e.g., with anthropometric, geometric, and/or biomechanical data) may be used to estimate the amount of force offloading from the assistive device. The latter (offloading force) may be subtracted from the former (lumbar) force to compute the reduction in forces relative to the total musculoskeletal force experienced by the person. This reduction in force may then be used to estimate the reduction in tissue damage (e.g., due to mechanical fatigue processes) or ergonomic/injury risk.

This set of sensors could also be used to track body kinematics, and assess state or level of device assistance as a function of these kinematics to understand user behavior or influence device control.

Another method of use involves using body-segment motion from IMUs as well as force and/or displacement data from the instrumented clutch as part of a closed-loop controller that engages/disengages assistance or varies the amount of assistance provided (e.g., via adjusting the set point of engagement or via a separate powered actuator).

EXAMPLES

Figure 9:
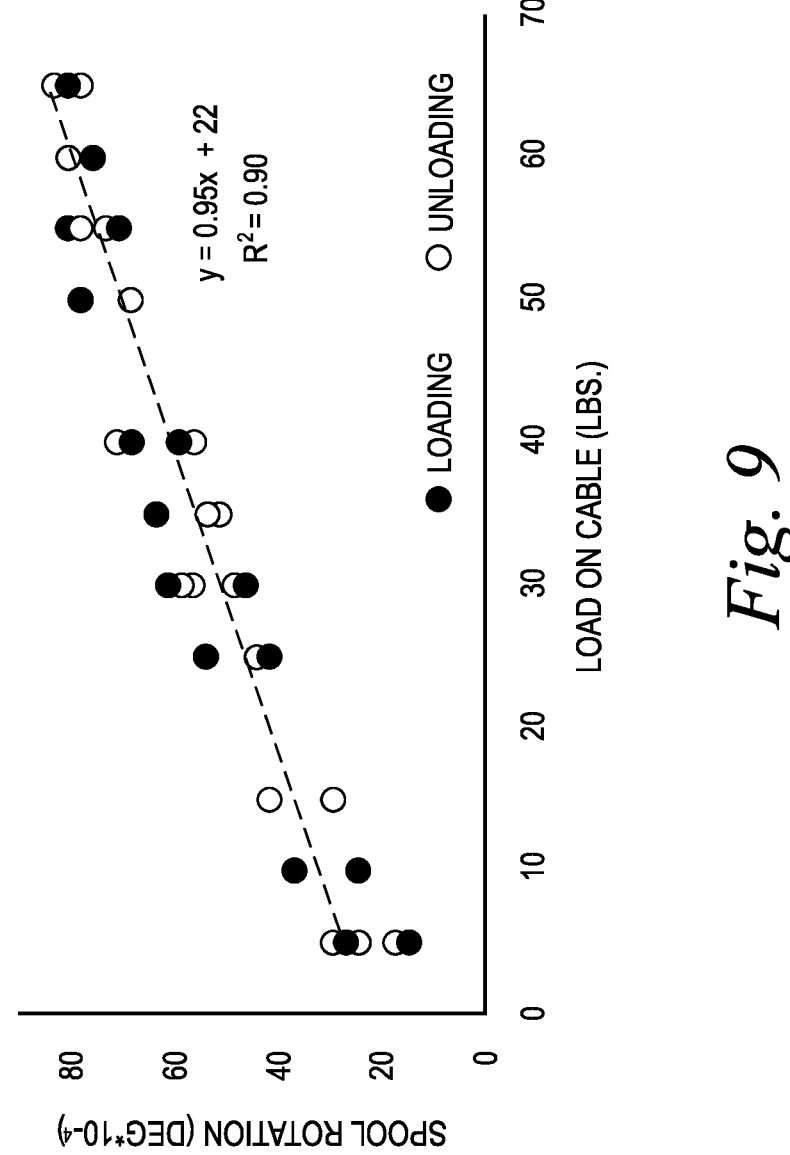
FIG. 9 is a plot of the rotation of an engaged spool stack under different loads.

Several examples were performed using the clutch mechanism shown in FIG. 2 of the present invention. Referring to FIG. 9, validation testing was performed on a prototype clutch mechanism of FIG. 2 to determine a relationship between the rotational elasticity in the disk and the load on the cable. The clutch mechanism was mounted to a vertical board and plate weights (5, 10, 25 lbs.) were progressively added and removed up to 65 lbs. Rotation data from the encoder was recorded using the microcontroller at each weight, and their relationship was found using linear regression. The center of the spool stack rotated 0.03 degrees for every pound loaded onto the cable.

The load on the cable was consistently measured by the encoder with an $R^2$ value of 0.90. This demonstrated and confirmed the ability to use a sensor in this clutch mechanism with this system design to estimate forces.

Figure 10:
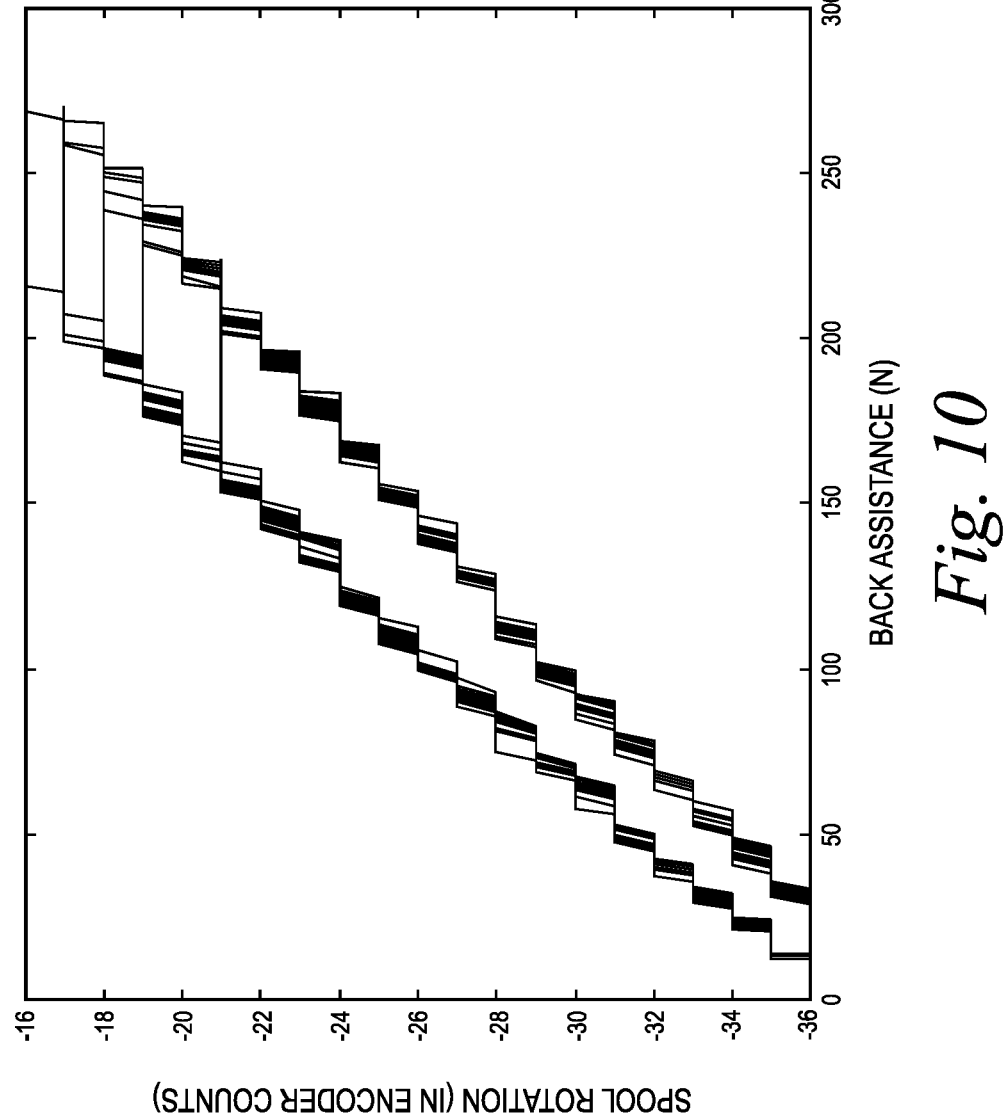
FIG. 10 is a plot of the rotation of an engaged spool stack versus back assistance.

Referring to FIG. 10, a plot showed a relationship between back assistance (N) and spool rotation (in encoder counts). The back assistance (N) is shown along the x-axis, while the spool rotation (in encoder counts) is shown along the y-axis. The data shown in FIG. 10 was collected as a person performed 10 stoop bends, while wearing an exosuit (a wearable assist device, which in this exemplary embodiment comprised upper-body and lower-body interfaces, elastic bands running over the back and buttocks and connecting the interfaces, and a clutch mechanism for engaging and disengaging the assistance). The clutch's encoder was used to measure spool rotation. A load cell (SureTorque Smart Load Cell) was used to measure the true load in the cable or back assistance. The existence of this relationship confirmed that spool rotation can be used to estimate back assistance when the clutch mechanism is in an engaged mode as a person performs stoop bends.

Figure 11:
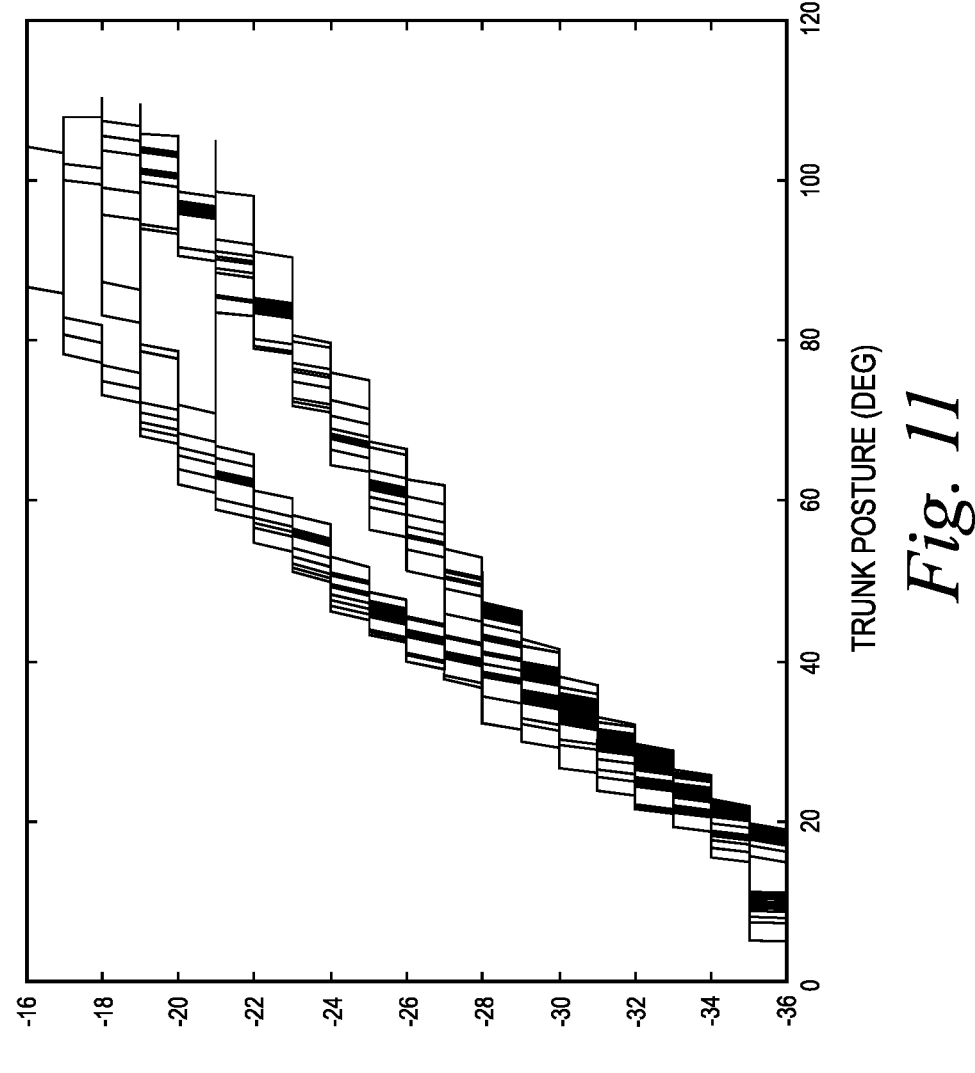
FIG. 11 is a plot of the rotation of an engaged spool stack versus trunk posture.

Referring to FIG. 11, the plot showed the relationship between trunk posture (degrees) and spool rotation (in encoder counts) when the clutch is in the engaged mode. The trunk posture (degrees) is shown along the x-axis, while the spool rotation (in encoder counts) is shown along the y-axis. The data shown in FIG. 11 was collected as a person performed 10 stoop bends, while wearing the exosuit with the clutch in an engaged mode. The data shown in FIG. 11 was collected as a person performed 10 stoop bends, while wearing the exosuit with the clutch in an engaged mode. The sensor was used to measure spool rotation. An IMU-based motion capture system was used to measure the true trunk posture. The existence of this relationship confirmed that spool rotation can be used to estimate trunk posture in clutch-engaged mode as a person performs stoop bends.

Figure 12:
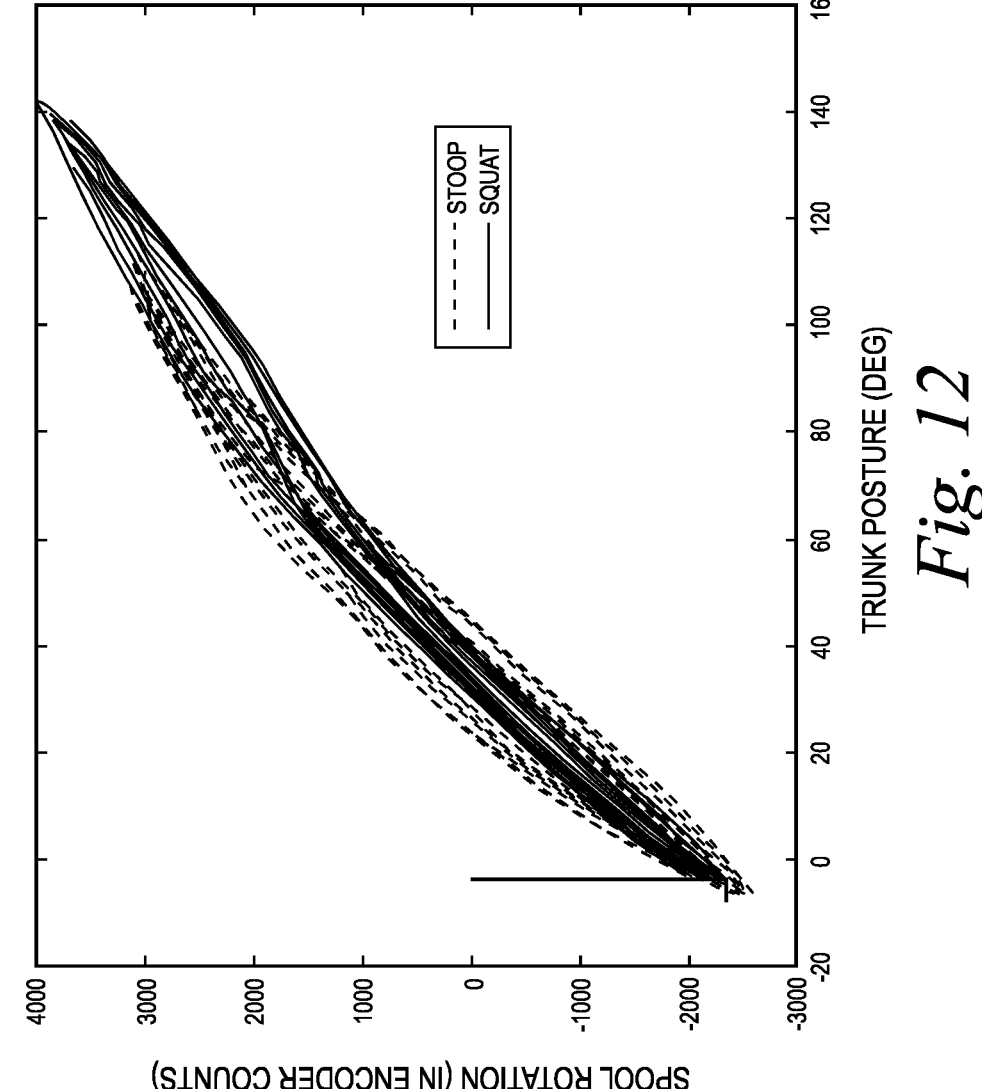
FIG. 12 is a plot of the rotation of a disengaged spool stack versus trunk posture.

Referring to FIG. 12, this plot showed the relationship between trunk posture (degrees) and spool rotation (in encoder counts) when the clutch mechanism is in the disengaged mode. This data shown in FIG. 12 was collected as a person performed 10 stoop bends and 10 squats, while wearing the exosuit when the clutch mechanism is in a disengaged mode. The sensor was used to measure spool rotation. An IMU-based motion capture system was used to measure true trunk posture. The stoops are shown as dashed lines of FIG. 12, while the squats are shown as solid lines. The existence of this relationship confirmed that spool rotation can be used to estimate trunk posture when the clutch mechanism is in a disengaged mode as a person performs stoop and squat bends.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

What is claimed is:

1. A clutch mechanism comprising: a spool that is configured to receive a cable, a disk with elasticity, a mechanism configured for locking and unlocking the movement of the disk, and at least one sensor for measuring the movement of at least one of the disk and the spool in an unlocked mode and for measuring the movement of the spool relative to the disk when in a locked mode,
   wherein the mechanism configured for locking and unlocking the disk for movement includes at least one ball bearing, at least one cam plunger, and at least one actuator.

2. The clutch mechanism of claim 1, wherein the disk has rotational elasticity, the mechanism configured for locking and unlocking the disk for rotational movement, and the at least one sensor for measuring the rotational movement of at least one of the disk and the spool in the unlocked mode and for measuring the rotational movement of the spool relative to the disk when in a locked mode.

3. The clutch mechanism of claim 2, wherein the disk includes an inner ring, an outer ring, and a plurality of spokes extending therebetween.

4. The clutch mechanism of claim 3, wherein the outer ring of the disk includes an exterior surface, the exterior surface of the outer ring forming a plurality of detents.

5. The clutch mechanism of claim 4, wherein the plurality of detents is from about 10 to about 180.

6. The clutch mechanism of claim 5, wherein the plurality of detents is from about 20 to about 100.

7. The clutch mechanism of claim 1 further including a spool cap, the spool cap being located between the disk and the spool.

8. The clutch mechanism of claim 1 further including a spring mechanism, the spring mechanism being received into an opening formed in the spool.

9. The clutch mechanism of claim 8, wherein the spring mechanism includes a power spring.

10. The clutch mechanism of claim 1, wherein the mechanism configured for locking and unlocking the disk for movement includes a plurality of ball bearings, a plurality of cam plungers, and a plurality of actuators.

11. The clutch mechanism of claim 1, wherein the at least one actuator is a pull latching solenoid.

12. The clutch mechanism of claim 1, wherein the at least one sensor is a magnetic sensor, and the clutch mechanism further includes a magnet.

13. The clutch mechanism of claim 1 further including the cable, and wherein the spool forms a groove on an exterior surface thereof for receiving the cable.

14. The clutch mechanism of claim 1 further including a support plate with at least one axis extending outwardly therefrom.

15. The clutch mechanism of claim 14, wherein the support plate includes a plurality of axes extending outwardly therefrom.

16. A wearable assist device in combination with the clutch mechanism of claim 1.

17. The clutch mechanism of claim 1, wherein the at least one actuator is a pulled tubular solenoid, a push tubular solenoid, a rotary solenoid, or an electric motor.

18. A clutch mechanism comprising: a spool that is configured to receive a cable, a disk with rotational elasticity that includes a plurality of detents formed on an exterior surface thereof, a spring mechanism being received into an opening formed in the spool, at least one ball bearing, at least one cam plunger, at least one solenoid, and at least one sensor for measuring the rotational movement of at least one of the disk and the spool in an unlocked mode and for measuring the rotational movement of the spool relative to the disk when in a locked mode,
   wherein the plurality of detents, the at least one ball bearing, the at least one cam plunger, and the at least one solenoid assists in locking and unlocking the disk for rotational movement.

19. The clutch mechanism of claim 18, wherein the disk includes an inner ring, an outer ring, and a plurality of spokes extending therebetween.

20. A method of using a clutch mechanism, the method comprising:
   providing a spool that is configured to receive a cable, a disk with elasticity, a mechanism configured for locking and unlocking the movement of the disk, and at least one sensor;
   measuring the movement of at least one of the disk and the spool in an unlocked mode via the at least one sensor, and
   measuring the movement of the spool relative to the disk when in a locked mode via the at least one sensor,
   wherein the mechanism configured for locking and unlocking the disk for movement includes at least one ball bearing, at least one cam plunger, and at least one actuator.

* * * * *